Patented Oct. 30, 1951

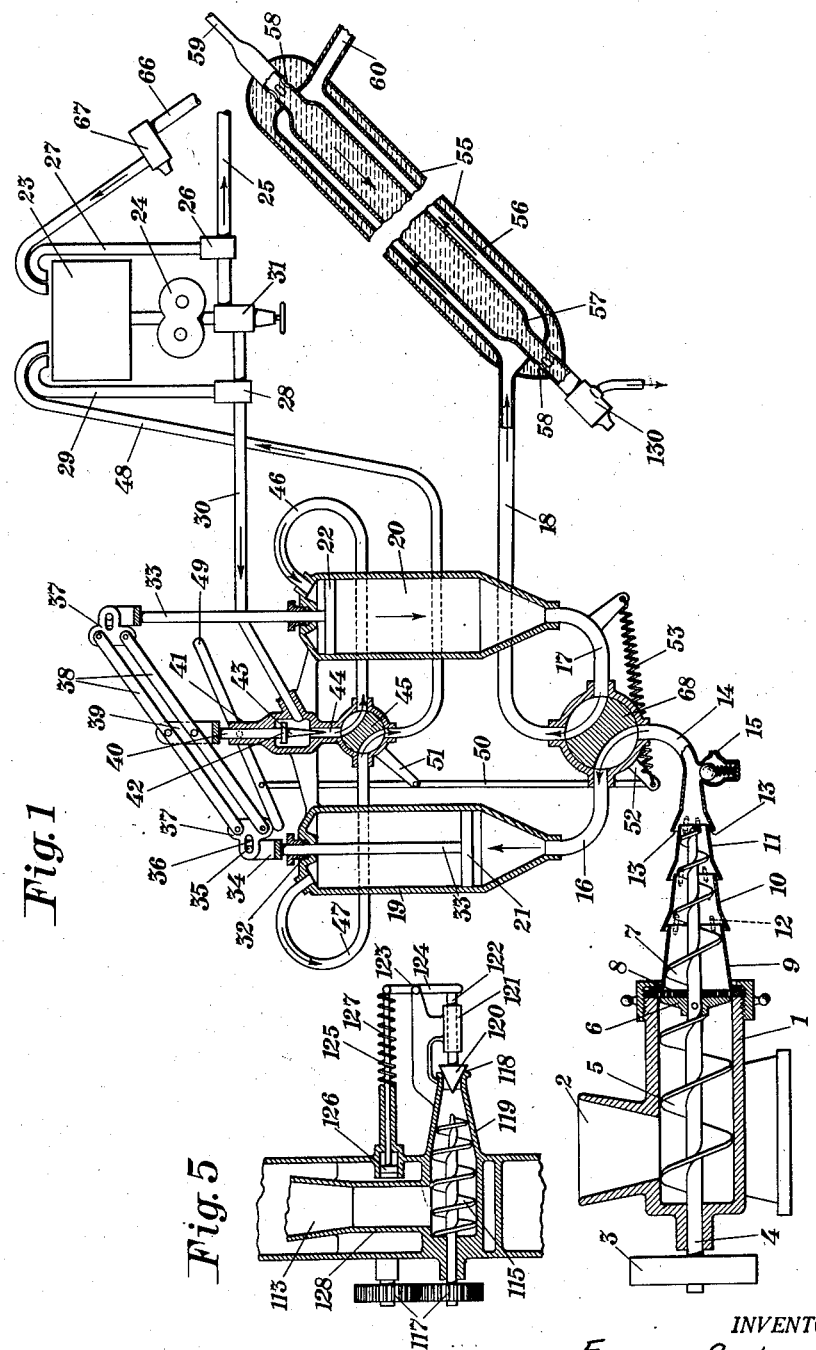

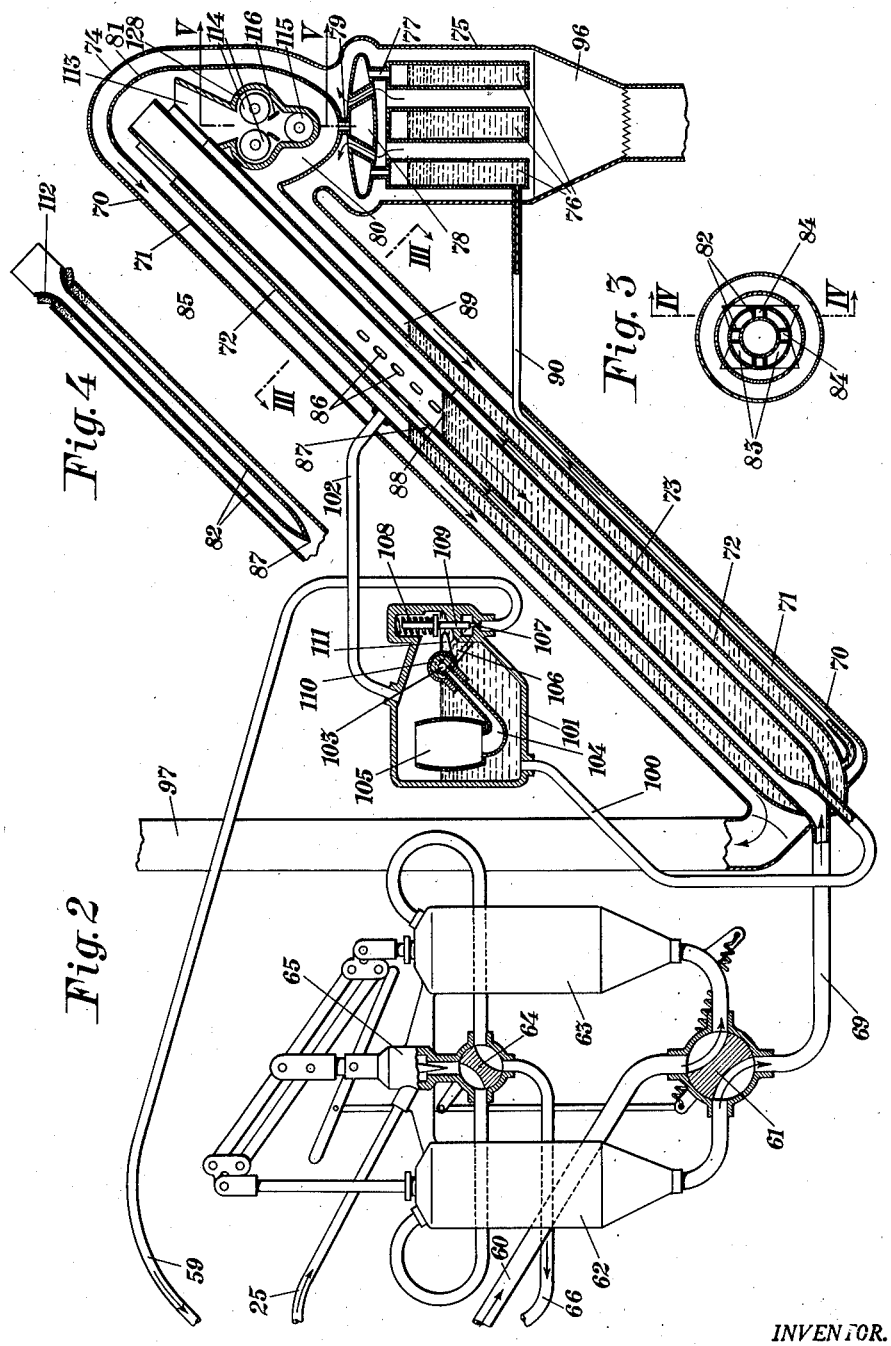

2,573,134

UNITED STATES PATENT OFFICE 2,573,134

APPARATUS FOR DEHYDRATING PEAT HAVING A HIGH WATER CONTENT

Franz Gebauer, Lofer, Austria

Application February 29, 1948, Serial No. 12,175
In Austria January 22, 1947

10 Claims. (Cl. 44—33)

This invention relates to apparatus for dehydrating peat or similar substances having a high water content. As it is well known in the art, it is very difficult to completely dehydrate or dry peat the water content of which may amount up to 90 per cent, since this water is bound to the dry substance not only mechanically, but also chemically or colloidally. Although by mechanical means, for instance by a press or the like, merely a part of the water mechanically bound can be removed, such a pressing method requires such a high energy that the process cannot be performed in an economic manner.

Attempts have been also made to separate the colloidally bound water from the peat by subjecting the raw peat to a suitable temperature and at the same time to an appropriate pressure. By such a combined heat and pressure method which is known as a so-called wet carbonization, water is liberated from the peat, but it was not possible heretofore to separate this liberated water from the dry substance of the peat, since the sieves or the like of filter presses or similar devices used for this purpose have been clogged in a short time. For liberating the water, a relatively high temperature, such as about 200° C., and a sufficiently high pressure is required so as to prevent the water from evaporating at this temperature. Since the further treatment of the mixture of water and peat in presses or the like takes place under a pressure considerably lower than that used for the wet carbonization, the highly heated mixture must be cooled down at least to a temperature below 100° C., if it is desired to prevent the liberated water from being evaporated due to expansion. Such a cooling, however, causes remarkable heat losses so that the process above referred to cannot be performed economically.

The object of the present invention is to overcome said difficulties and to provide a process for dehydrating peat or the like at elevated temperatures and under pressure, wherein the water is liberated, as well as separated from the peat in a continuous way, the heat losses are reduced as far as possible and a good economy of the overall process is obtained.

A further object of this invention is to provide a process for dehydrating peat or the like at elevated temperatures and under pressure, wherein the liberated water is completely separated from the peat and this continuous separation is effected immediately after the liberation so that the separation takes place at substantially the same temperature and under substantially the same pressure as the liberation.

Another object of my invention is to provide a process for dehydrating peat or the like at elevated temperatures and under pressure, wherein the considerable amount of heat of the hot water liberated from the peat is utilized for the greatest part by using this water to preheat the raw peat to be supplied to the dehydrating apparatus so that heat economy is remarkably improved.

A still further object of this invention is to provide an apparatus for dehydrating peat or the like at elevated temperatures and under pressure, wherein no special device requiring energy is necessary to separate the liberated water from the peat so that economy of the overall process is further remarkably improved.

Another object of the invention is to provide an apparatus for dehydrating peat or the like at elevated temperatures and under pressure, wherein means are provided to introduce the raw peat into, and discharge the dried peat from a closed vessel or autoclave so that pressure within this vessel is kept constant at the desired height.

These and other objects and advantages of this invention will be apparent from the following description.

An embodiment of the plant for dehydrating peat is diagrammatically illustrated by way of example in the accompanying drawings in which Fig. 1 shows, partly in section, the crushing device, the low pressure pump and the preheater, Fig. 2 shows, partly in section, the high pressure pump, the proper dehydrating apparatus and the discharge device, Fig. 3 is a section along the line III—III of Fig. 2, Fig. 4 is a section along the line IV—IV of Fig. 3, and Fig. 5 is a section along the line V—V of Fig. 2.

Generally speaking, the raw peat is at first completely crushed in a crusher and the fluid or semifluid mass or pulp thus formed is forced by a low pressure pump into a preheater, where it is heated up to a suitable temperature. After having passed the preheater, the mass is supplied by a high pressure pump to the proper dehydrating apparatus in which the peat is completely deprived of its water content under suitable pressure and temperature, whereupon the peat is discharged from this apparatus in the form of a substantially dry powder. The first part of the plant comprising the crusher, the low pressure pump and the preheater, is shown in Fig. 1, the second part comprising the high pressure pump, the dehydrating device and the discharge device for the dry peat is shown in Fig. 2. The several units and the manner of their cooperation will now be described.

The crusher comprises a casing 1 having a hopper 2 for feeding the raw peat. A shaft 4 rotatably mounted in the casing 1 and driven by a pulley 3, carries a worm conveyor 5, a cutter 6 having a plurality of edges, and a conical worm conveyor 7. A sieve-like disc 8 is secured to the casing 1 between the cutter 6 and the worm 7. The conical worm 7 is surrounded by a series of conical sleeves 9, 10 and 11 which are interconnected by a plurality of strips 12 and leave narrow slots 13 between each other.

The raw peat filled in the hopper 2 is supplied by the worm 5 to the cutter 6 and forced through the sieve-like disc 8 whereby the peat is cut and crushed into small particles so that the mechanical bond between a part of the water content and the peat is loosened. The worm 7 forces the crushed raw peat through the conical sleeves 9, 10 and 11 so that a part of the water escapes through the slots 13, and the partly dehydrated mass or pulp is then passed into a pipe 14 provided with a spring loaded outlet valve 15.

A rotary slide valve 68 connects in the illustrated position the pipe 14 with a pipe 16 on the one hand, and a pipe 17 with a pipe 18 on the other hand. When the valve 16 is turned through an angle of 90°, it connects the pipes 14 and 17 on one hand, and the pipes 16 and 18 on the other hand, this latter pipe 18 leading to the preheater to be described later on. The pipes 16, 17 lead to cylinders 19 and 20 in which pistons 21 and 22 are working respectively. The cylinders 19, 20 are permanently filled with peat below, and with a pressure fluid, such as pressure water or pressure oil, above their pistons. This fluid which is accumulated in a storage tank 23 open at the top, is sent under pressure and forced by a rotary pump 24 through a pipe 25 to the high pressure pump to be described hereinafter. To compensate temporary increases of pressure, an outlet valve 26 is arranged in the pipe 25, this valve being adapted to return superfluous amounts of fluid through the pipe 27 to the tank 23. A similar valve 28 opening into a pipe 29 is arranged in the pipe 30 leading from the pump 24 to the low pressure pump comprising the cylinders 19, 20. Since this pump is working under a smaller pressure than the high pressure pump, the pressure of the fluid fed by the pump 24 is reduced in a pressure regulating valve 31.

The rods 33 of the pistons 21, 22 are guided in stuffing boxes 32 and carry on their upper ends bifurcated heads 34 in which bolts 35 are secured. These bolts pass through horizontal slots 36 in joint members 37 which are interconnected by two parallel levers 38. The latter are pivotally mounted in a bifurcated head 39 of a rod 40 axially displaceable in a casing 41. The rod 40 carries a collar 42 and is tapered off at its lower end so as to form a valve needle 43. The latter controls a passage 44 which is connected by a distribution rotary slide valve 45 in the shown position through a pipe 46 with the upper end of the cylinder 20, while the pipe 47 opening into the upper end of the cylinder 19 communicates with the return pipe 48 leading to the tank 23. When the distributing rotary valve 45 is rotated through an angle of 90°, the passage 44 is connected through the pipe 47 with the cylinder 19, and the cylinder 20 is connected through the pipe 46 with the return pipe 48. On the casing 41 is moreover mounted a double-armed lever 49 which is connected by means of a rod 50 with arms 51 and 52 secured to the rotary valves 45 and 68 respectively. The arm 52 is influenced by a spring 53 which is directed so that it is moved through a dead centre position, when the rotary valves are switched over, and tends to hold the rotary valves in one of their end positions.

In the illustrated position, the piston 21 is in its lower, the piston 22 in its upper end position. The mass supplied by the worm 7 forces the piston 21 upwards, which returns the pressure fluid (not being under pressure) from the cylinder 19 through pipe 47, rotary valve 45 and pipe 48 into the tank 23. The pressure fluid supplied through pipe 30, passage 44 and pipe 46 forces at the same time the piston 22 downwards whereby the mass filling the cylinder 20 is forced through pipe 17, rotary valve 68, and pipe 18 into the preheater. The joint member 37 of the piston 22 strikes in the course of its down stroke against the end of the lever 49, thus rocking the latter whereby the rotary valves 68, 45 are switched over. Now the cylinder 20 is filled with peat, while the peat in the cylinder 19 is supplied therefrom to the preheater, whereupon the described cycle of operation is repeated.

In practice, it will not be possible normally to feed constant amounts of peat per time unit to the hopper 2, moreover the water content of the raw peat, as well as the amount of water escaping through the slots 13 will vary. For this reason, also the amount of raw peat supplied through the pipe 14 per unit of time, will vary likewise. When for example the amount of peat supplied to the cylinder 19 per unit of time, decreases so that the piston 21 is raised more slowly than the piston 22 is lowered, the rod 40 is lowered by the lever 38 and the valve 43 throttles the inlet section of the passage 44 and therefore also the supply of the pressure fluid to the cylinder 20. The piston 22 is therefore retarded, so that its operation is automatically adapted to the speed of the piston 21. When the amount of peat supplied through the pipe 14 increases, the reverse operation takes place.

When, for any reason, the worm 7 feeds no peat at all, the piston 21 is stopped and the valve 43 shuts off the passage 44 completely so that the piston 22 is stopped likewise. When, however, for any reason, the supply of pressure fluid through the pipe 30 is interrupted, the piston 22 is stopped so that the rod 40 is raised, until its collar 42 strikes against the upper part of the casing 41, whereby the piston 21 is likewise stopped. The peat which is further fed by the worm 7 escapes therefore through the valve 15. By the operation of this valve or by the collar 42 striking against the casing 41, an alarm device may be operated so as to indicate the breakdown of the operation.

It is therefore apparent that the operation of the described pump is automatically adapted to the amount of peat supplied thereto. By this means the important advantage is attained that when the supply of peat through pipe 14 decreases, air is prevented from being sucked into the apparatus and any idle operation of the pump is avoided.

The preheater comprises an inclined tubular jacket 55 in which the peat conduit consisting of two concentric tubes 56, 57 is arranged. The interior of the inner tube 57 communicates through openings 58 with the annular space formed between the outer tube 56 and the jacket 55. The waste water which is separated from the peat in the dehydration apparatus, as described below, is supplied through a pipe 59 and passes downwards through the tube 57, as well as between the tube 56 and the jacket 55, and is discharged through an adjustable valve 130. By suitably adjusting this valve, the pressure of the waste water is kept sufficiently high so as to prevent the same from evaporating in the preheater. By the pump described above, the peat is forced through the pipe 13 counter-current to the waste water through the preheater so that this water gives off almost its whole heat to the peat.

The peat discharged from the preheater passes through a pipe 60 into a high pressure pump (see Fig. 2) which substantially consists of the rotary valve 61, the cylinders 62, 63 and the distributing rotary valve 64. The construction and operation of this pump exactly corresponds to that of the described low pressure pump and therefore need not be described but the high pressure pump works under a higher pressure than the low pressure pump. The feeding pipe 25 supplies the pressure fluid from the tank 23 to the casing 65 which corresponds to the casing 41 of the low pressure pump. The return pipe 66 leads from the distribution rotary valve 64 back to the tank 23. In this pipe is provided an adjustable throttling valve 67 the resistance of which sets the returning pressure fluid under a predetermined counter-pressure. It is apparent that by this counter-pressure, the piston of that cylinder 62 or 63 which is being filled at a given moment with peat supplied from the preheater. In this manner the desired pressure in the preheater is obtained by suitably adjusting the valve 67.

As it will be seen from the foregoing description, the operation of the low pressure pump, as well as of the high pressure pump is automatically controlled by the amount of raw peat fed by the worm 7 per time unit, and a preheated pump or mass is supplied under the required high pressure through the pipe 69 to the dehydrating apparatus. By this means air is prevented from being incorporated in said mass.

The dehydrating apparatus or autoclave substantially comprises several concentric tubular members, viz. an outer jacket 70, an intermediate jacket 71, an outer tube 72 and an inner tube 73. The upper end of the outer jacket 70 is formed as a downwardly extending hood 74 to which adjoins a steam boiler 75 provided with any desired furnace. The steam generated in the spaces 76 passes through passages 77 into a superheater 78 where it is superheated, and further through a passage 79 into the space 80 enclosed by an inner hood 81 adjoining to the jacket 71. The superheated steam enters then partly the interior of the tube 73 and partly the annular space between the jacket 71 and the tube 72. The flue gases pass from the furnace 96 upwards, heat the spaces 76, enter the space between the hoods 74 and 81, then pass downwards in the annular space between the jackets 70 and 71, and are finally withdrawn through the chimney 97.

The peat is forced upwards in the annular space between the tubes 72 and 73. In the upper part of this space there are arranged four pairs of two radially extending, longitudinal ribs 82 so that the said annular space is subdivided into four broader sections 83 and four narrower sections 84, as shown in Figs. 3 and 4. The ribs are provided with numerous, narrow holes 85 and the inner tube 73 has openings 86. As shown in Fig. 4, the lower ends of the ribs 82 converge so as to form a set of cutting edges 87.

As stated above, the flue gases pass through the spaces between the hoods 74 and 81, and then between the jacket 70 and the tube 71 so that the steam produced in the boiler 75 is superheated not only in the superheater 78, but also within the hood 81. The peat is fed by the high pressure pump through the pipe 69 and forced upwards in the annular space between the tubes 72 and 73. The temperature and pressure are adjusted so that the colloidal bond between peat and water is completely destroyed so that the waste water contained in the peat is liberated in the upper part of the apparatus. The mass continuously moving upwards is subdivided by the edges 87 into four strands which pass through the broader sections 83 of the annular space. The liberated waste water passes through the openings 85 of the ribs 82 into the narrower sections 84 and runs down in the latter, then passes through the openings 86 of the tube 73 into the interior of the latter and is collected in the lower part of this tube 73, thus forming a free surface or level at 88. The steam is condensed in the upper part of the apparatus and a part of the condensate is admixed to the waste water in the tube 73, whilst another part of the condensate accumulates in the annular space between the jacket 71 and the tube 72, the level of this water being at 89, that is somewhat higher than the level 88 of the waste water. This annular space communicates through a pipe 90 with the water spaces 76 of the boiler 75 so that a permanent circulation of the heating water in the direction of the arrows is obtained and the level 89 is in the same height as that of the boiler 75. It is to be seen that the waste water is kept completely separated from the heating water returning to the boiler so that the heating water is prevented from being soiled by impurities.

It is to be seen from the foregoing that the preheated peat is heated in the lower part of the dehydrating apparatus by waste water from inside, and by heating water from outside, whilst it is heated in the upper part immediately by steam so that the temperature of peat is gradually increased from below upwards. It is also apparent that the liberated waste water is separated from the peat solely by gravity so that for such separation no particular device is required.

Since the amount of peat supplied to the dehydrating device per unit of time on one hand, and the water content of the peat on the other hand is subjected to variations, the amount of waste water separated from the peat also varies. To secure a satisfactory and reliable operation, however, the lever 88 of the waste water must be maintained substantially constant. A regulating device for this purpose will be described now.

The lower end of the tube 73 is connected through a pipe 100 to a casing 101 of a waste water regulator in which the water level is in the same height as the level 88. For pressure compensation, the steam space of the casing 101 communicates through a pipe 102 with the steam space of the dehydrating apparatus. On a stationary stud 103 is swingably mounted a pipe 104 carrying a float 105 open at its top. The interior of the float 105 communicates through the pipe 104, a bore in the stud 103 and a passage 106 with a channel 107 the upper end of which is formed as a seat for a valve 108 loaded by a spring 109. To the pipe 104 is secured a sleeve 110 rotatable on the stud 103, said sleeve carrying an arm 111 to operate the valve 109. The channel 107 is connected through the pipe 59 with the tube 57 of the preheater.

When the level 88 of the waste water rises so far that water is filled into the float 105, the latter sinks and the arm 111 opens the valve 109 so that water is discharged into the preheater in which a smaller pressure exists than in the waste water regulator, the float is emptied and rises again and the valve 109 shuts off the passage 107, whereupon the described operation is repeated.

Water begins to escape from the peat approximately on the point where the peat enters the steam space of the dehydrating apparatus, that is nearly in the height of the water level 88. Since the upwardly moving peat is then gradually deprived from its water, it tends to cake together and to shrink so that there would be some danger of the peat adhering more or less to the tube 73. This danger is obviated by the peat being subdivided by the edges 87 into four strands in the described manner. The vertically extending ribs 82 (see Fig. 3) form outwardly curved guiding surfaces 112 at their upper ends. The peat passing through the steam space is completely dehydrated or dried and, if desired, more or less carbonized. The four strands are guided outwardly by the guiding surfaces 112 and thus broken into individual pieces which fall into a hopper 113. These pieces are ground between rollers 114 to powder which is carried off by a worm conveyor 115 to the discharge opening of the dehydrating apparatus. Laths 116 contacting the rollers 114 on their under side strip the peat off from the rollers 114 thus keeping the latter clean. The rollers are interconnected by gear wheels 117 for opposite rotation and are driven by any desired means.

The discharge opening 118 of the cone 119 surrounding the worm 115 is controlled by a valve 120 carried by a rod 122 displaceable in a bracket 121. A lever 124 swingably mounted at 123 connects the rod 122 with another rod 125 carrying a piston 126 which is under the influence of the steam presure. A coiled spring 127 tends to press the valve 120 on its seat. By suitably choosing the diameters of the discharge opening 118 and the piston 126, it is attained that the valve 120 is not influenced by the steam pressure and is therefore loaded exclusively by the spring 127.

The distance between the worm 115 and the valve 120 is such that the friction between the cone 119 and the compact peat strand or moving stopper passing therethrough is sufficiently high so as to form a steam-tight closing at the discharge opening 118 and to prevent steam from escaping outwards. In order to prevent any danger of clogging within the casing 128 enclosing the rollers 114, and within the cone 119, it will be necessary to drive the rollers 114 and the worm 115 at a higher speed than that corresponding to their maximum capacity. Since the amount of dried or carbonized peat passing through the cone 119 per time unit is generally varying, the valve 120 will automatically offer a more or less passage section at the discharge opening 118 so that a tight closure between the interior of the apparatus and the open air is permanently maintained.

If the dried material is easily combustible and there exists therefore some danger of self-ignition due to its high temperature, when it is discharged into open air it will be suitable to leave a slight amount of humidity in the material. This humidity evaporates upon the discharge owing to expansion whereby the temperature of the material is lowered beyond that temperature at which self-ignition would take place. In such a case, expansion takes place in an atmosphere of steam so that air is temporarily prevented from contacting the hot material.

Within the scope of this invention, various modifications of the described process and apparatus are possible. According to the conditions the low pressure pump may be dispensed with so that the peat may be forced by the crusher directly into the preheater. Under certain circumstances, also the preheater together with the low pressure pump may be dispensed with in which case the peat is supplied from the crusher directly to the high pressure pump. The axis of the preheater and/or of the autoclave or dehydrating apparatus may be vertical instead of being inclined. The water space and steam space of this apparatus may be formed in separate units. A plurality of autoclaves may be combined to form a battery which may be provided with a common discharge device. A common steam boiler may be provided for several autoclaves. Apparently any suitable devices may be used to crush the raw material to be treated, as well as the dried material. Grinding or milling rollers or other similar crushers within the autoclave may be dispensed with under certain circumstances. The low pressure and high pressure pump may be combined to form a single unit and numerous other modifications may be made.

What I claim is:

1. An apparatus for dehydrating peat, which comprises means to crush the raw peat to convert the same to a substantially fluid mass, an autoclave, means to supply steam to the upper end of said autoclave, a conduit passing through said autoclave in upward direction to convey the mass through said autoclave, means to continuously force the mass through said conduit, and openings in the upper part of said conduit to allow the water liberated from the mass to escape therethrough.

2. An apparatus for dehydrating peat, as claimed in claim 1, wherein said autoclave has substantially the form of a tube concentric with, and surrounding said conduit.

3. An apparatus for dehydrating peat, as claimed in claim 1, wherein said conduit is formed by two concentrical tubes passing through said autoclave in an upwardly inclined direction, said openings being provided in the inner one of these tubes.

4. An apparatus for dehydrating peat, as claimed in claim 1, wherein said conduit has its upper open end situated within said autoclave, a peat disintegrating device being arranged within said autoclave near the upper end of said conduit to disintegrate the dried peat discharged from this end, a worm conveyor being arranged within said autoclave near said disintegrating device to discharge the disintegrated, dried peat from said autoclave.

5. An apparatus for dehydrating peat, as claimed in claim 1, wherein said autoclave has its discharge opening for the dried peat controlled by a mechanically loaded, balanced valve, the load of this valve surpassing the steam pressure existing within said autoclave.

6. An apparatus for dehydrating peat, which comprises means to crush the raw peat to convert the same to a substantially fluid mass, an autoclave, means to supply steam to the upper end of said autoclave, a conduit passing upwardly through said autoclave to convey the mass therethrough, openings in the upper part of said conduit to allow the water liberated from the mass to escape therethrough, a pump arranged between said crushing means and said autoclave to force the mass through said conduit, said pump comprising two cylinders, pipes for said mass to connect said cylinders with said crushing means and with said conduit, a valve in said pipes to alternately connect one of said cylinders to said crushing means, and the other to said conduit, two pistons oppositely reciprocating in said cylinders, means to alternately supply a pressure fluid to said cylinders so as to drive said pistons, mechanical means to interconnect said pistons, and a valve arranged in the supply pipe of said pressure fluid and operatively connected to said mechanical means and to said first named valve so as to control the supply of the pressure fluid in correspondence with the supply of the fluid mass to be dehydrated.

7. An apparatus for dehydrating peat, as claimed in claim 6, wherein said mechanical means comprise a lever connected at its ends to the rods of said pistons, and swingably mounted between its ends on the stem of said last named valve.

8. An apparatus for dehydrating peat, which comprises means to crush the raw peat to convert the same to a substantially fluid mass, an autoclave, means to supply steam to the upper end of said autoclave, a conduit passing upwardly through said autoclave to convey said mass therethrough, openings in the upper part of said conduit to allow the water liberated from the mass to escape therethrough, a preheater to preheat the mass to be supplied to said conduit by the water separated from the mass in said autoclave, a low pressure pump to force the mass through said preheater, and a high pressure pump to supply the mass from said preheater to said conduit and through the latter.

9. An apparatus for dehydrating peat, as claimed in claim 8, wherein a worm conveyor is provided to supply the mass from said crushing means to said low pressure pump.

10. An apparatus for dehydrating peat, as claimed in claim 8, wherein the pipe leading from said crushing means to said low pressure pump, comprises a worm conveyor for the mass and is provided with openings to allow water to escape therethrough.

FRANZ GEBAUER.

REFERENCES CITED

The following references are of record in the file of this patent:

UNITED STATES PATENTS

| Number | Name | Date |
|---|---|---|
| 581,354 | Lapp | Apr. 27, 1897 |
| 799,939 | Reynolds et al. | Sept. 19, 1905 |
| 1,024,230 | Turner et al. | Apr. 23, 1912 |
| 1,290,494 | Bosch | Jan. 7, 1919 |